United States Patent [19]

Sweeny

[11] Patent Number: 5,778,633
[45] Date of Patent: Jul. 14, 1998

[54] QUICK CHANGE LEDGE SUPPORT ASSEMBLY FOR FILLING AND CAPPING MACHINES

[75] Inventor: Kevin M. Sweeny. Columbia Station, Ohio

[73] Assignee: FCI, Inc., Cleveland, Ohio

[21] Appl. No.: 888,782

[22] Filed: Jul. 7, 1997

Related U.S. Application Data

[63] Continuation-in-part of Ser. No. 645,556, May 13, 1996, Pat. No. 5,689,932, and Ser. No. 681,364, Jul. 23, 1996, Pat. No. 5,732,528.

[51] Int. Cl.[6] .................. B65B 7/28; B65B 59/04
[52] U.S. Cl. .................. 53/201; 53/253; 53/300
[58] Field of Search ................. 53/201, 253, 249, 53/282, 250, 283, 273, 272, 300, 471

[56] References Cited

U.S. PATENT DOCUMENTS

| | | | |
|---|---|---|---|
| 2,987,313 | 6/1961 | Bjering et al. | 269/153 |
| 3,432,989 | 3/1969 | Bouzereau | 53/264 |
| 3,537,231 | 11/1970 | Dimond | 53/201 |
| 3,587,829 | 6/1971 | Sorensen | 198/131 |
| 3,875,725 | 4/1975 | Carmichael | 53/300 X |
| 4,099,361 | 7/1978 | Dix et al. | 53/201 X |
| 4,114,347 | 9/1978 | Morris et al. | 53/300 |
| 4,295,320 | 10/1981 | Willingham | 53/201 |
| 4,624,098 | 11/1986 | Trendel | 53/314 |
| 4,663,913 | 5/1987 | Trendel | 53/314 |
| 4,939,890 | 7/1990 | Peronek et al. | 53/486 |
| 5,347,788 | 9/1994 | Petz et al. | 53/282 |
| 5,671,585 | 9/1997 | Peronek et al. | 53/201 X |
| 5,689,932 | 11/1997 | Peronek et al. | 53/201 |

*Primary Examiner*—James F. Coan
*Attorney, Agent, or Firm*—Vickers, Daniels & Young

[57] ABSTRACT

An improved ledge support assembly for a filling machine for filling containers is provided. The ledge support assembly supports and retains the containers in the machine during movement through the machine. The ledge support assembly includes a pocket support portion for holding the neck portion of a bottle and a back support portion for supporting the container body portion of a bottle in a single position during rotation. A locking mechanism is provided on the pocket support and a second locking mechanism is provided on the back support for releasably attaching each of the pocket support and the back support to the ledge support assembly.

44 Claims, 12 Drawing Sheets

QUICK CHANGE LEDGE SUPPORT ASSEMBLY FOR FILLING AND CAPPING MACHINES

This is a continuation-in-part of application Ser. No. 08/645,556, filed May 13, 1996 now U.S. Pat. No. 5,689,932, and a continuation-in-part of application Ser. No. 08/681,364, filed Jul. 23, 1996, now U.S. Pat. No. 5,732,528.

The present invention relates generally to an apparatus for use in the bottling industry for filling or capping containers and more particularly to an improvement for use in filling machines which allows quick changeover of the machine to allow different size bottles to be run on the same machine.

INCORPORATION BY REFERENCE

Application Ser. No. 08/645,556, filed May 13, 1996, and application Ser. No. 08/681,364, filed Jul. 23, 1996, are incorporated by reference herein so that background information and structure on filling and capping machines need not be described in detail herein.

BACKGROUND OF THE INVENTION

Bottling machines, which are defined herein so as to include both machines for filling containers or capping containers after being filled are well know in the prior art. Reference may be had to Applicant's prior filed applications, which are incorporated by reference as described above, for more details as to such filling and capping containers. Such machines will not be described in detail in the specification.

Generally, a capping or filling apparatus includes a rotatable wheel mechanism, or star wheel, for moving the bottles or containers through the machine. The rotatable wheel also generally includes a mechanism for supporting each container which can either be a plurality of removable ledge support assemblies or pockets within the star wheel hub that are arranged about the periphery of the star wheel. An infeed mechanism or conveyor is utilized to bring bottles to an entry point on the star wheel, and an outfeed mechanism or conveyor is similarly mated to the rotatable wheel to transport the filled (or capped) bottles to an exit point on the star wheel. A stationary rear guide extending generally between the entry and exit point is spaced radially outward from the ledge support assemblies or the rotatable star wheel. This rear guide, together with a back support attached to the rotatable wheel, functions to retain the lower body portion of the bottle in a perpendicular position within each individual ledge support assembly as the star wheel rotates. In a bottle filling apparatus, a filling head is located above the star wheel. The filling head is driven axially downward at predetermined periods of time to place product within the bottle.

Within a bottling plant or facility, a single capping or filling machine is used to fill or cap many different size bottles. In the soft drink industry, such size bottles can include a 12-ounce, a 20-ounce, a 1-liter bottle or others. Positive control of the bottles throughout the machine is typically maintained by holding the bottles by the neck, and specifically suspending the bottles by a bottle neck ring on the bottle. Thus, based upon a predetermined control height, all bottles will be suspended throughout the filling or capping process by the bottle neck ring. The control height is determined by the tallest bottle to be filled. This height is then maintained constant for all other size bottles to be run on the same machine. Normally, the bottle will be suspended ¼-inch above the normal wear surface. Mounted on the basic shaft of the bottling machine is a hub which supports the mounting plate or a rotatable wheel thereon. As the shaft is rotated, the hub rotates the rotatable wheel thus moving bottles through the machine to accomplish the capping and filling process. Smaller star wheels include neck support assemblies integral with the hub. Larger star wheel assemblies include ledge support assemblies mounted on the rotatable wheel. In either instance, a neck support bracket, holding the bottle by the bottle neck ring, has fingers extending therefrom and supports the neck of the bottle. In order to retain the control height constant for different size bottles, each bottle requires a different size and/or shape neck support bracket and a lower body guide support. The lower body guide support can include both a rear guide (not on the rotatable wheel) and back supports located radially inward. These back supports retain the side wall of the bottle in position. Thus, in each instance where the bottle size to be run is changed, it is necessary to changeover different aspects of the bottling machine including those portions of the machine which are specific to the particular bottle size being run on the line.

In a bottling plant, such a changeover requires the use of skilled labor to remove the equipment which is specific for a particular size bottle and replace it with substitute equipment which is specific for a different size bottle. Maintaining the volume of a machine, which typically involves thousands of bottles passing through a machine each hour, is very important to meeting both consumer and industry demands, as well as meeting plant capacity requirements. Thus, the downtime associated with the changeover to different size bottles is a significant loss of both dollars and lost productivity. Reduced output capacity, idle manpower and the skilled workforce required to complete a changeover all significantly add to the costs of manufacture. The use of common fasteners such as bolts to attach the interchangeable aspects of the bottling machine, increases the time required to complete a changeover. Nuts and bolts also add to the number of spare parts which must be inventoried and readily available should others become lost or broken. Care also must be taken during changeover to ensure that all bolts are fastened tightly. Failure to do so may result in the bolts coming loose, causing damage to a machine or shutting down a line within a bottling plant.

Typically, a ledge support assembly, which comprises both the neck support for holding and supporting a container neck, and a back support which, in conjunction with the rear container guide, supports the container body portion are fixed within a rotatable wheel mechanism. When it is desired to change the bottling line to accommodate a different run of different size bottles, the rotatable wheel is removed and replaced with a different wheel for accommodating different size bottles. The body guide or back support included on the wheel for supporting the lower, thicker portion of the bottle, must also be adjusted for the size of the bottle to be run through the machine. Such adjustments usually involve removing the body guide, with the use of bolts and nuts, and replacing the body guide at another location. Each of the configurations currently being used has the requirement of being changed each time a different size bottle is to be run. Each change requires removing and replacing bolts and screws, significantly adding to downtime of a bottling line and reduced output capacity.

SUMMARY OF THE INVENTION

The present invention advantageously provides an improved ledge support assembly for a bottling machine which overcomes the disadvantages of prior art ledge support assembly arrangements. In this respect, an improved ledge support assembly for a filling machine is provided which includes interchangeable pieces and quick connect connections for those interchangeable pieces. Specifically, the ledge support assembly includes a pocket support portion for holding the neck of the bottle and a back support portion which includes a back rest portion attached thereon for supporting the container body portion in a single position during rotation. A first quick connect locking mechanism for releasably attaching the pocket support portion to the ledge support assembly and a second quick connect locking mechanism for releasably attaching the back rest portion to the back support portion is provided thereon.

In a preferred embodiment, the first quick connect lock mechanism for releasably attaching the pocket support portion includes a spring loaded piston on the ledge support assembly which is cooperable with a recess on the pocket support portion. The spring loaded piston includes a beveled head which engages a countersunk portion of the recess to capture and retain the pocket support portion in tension on the ledge support assembly. Thus, radial movement of the pocket support portion is prevented. In order to prevent circumferential movement, the ledge support assembly includes a recessed depression extending from an upper side of the neck support assembly. The recessed depression includes two grooves within the sidewalls opposite and generally parallel which extend from an opening into the recessed depression or pan area. The pocket support portion includes two tenons which coact with the two grooves and allow sliding of the tenons within the grooves. The combination of the quick connect locking mechanism together with the tenons within the grooves prevents both radial and circumferential movement of the pocket support portion. It will also be appreciated that the tenons within the grooves prevents any movement of the pocket support portion in an up and down or axial direction perpendicular to the radial direction.

Each of the pocket support portions include a retaining pocket formed by the opposite extending fingers of the pocket support portion. The retaining pocket is generally semicircular in configuration and encompasses an included angle of approximately 180° between adjacent fingers. This assembly allows the neck portion of the bottle to rest thereon. The standard size of a neck of a bottle generally ranges from between 28 mm to 38 mm for a 12-ounce and a 1-liter bottle, respectively. When it is desired to replace the pocket support portion, the spring loaded piston is depressed, releasing the head of the spring loaded piston from the recessed portion of the pocket support portion, whereupon the pocket support portion can be grasped and pulled radially outward until the tenons release from the grooves. A different pocket support portion having a different diameter retaining pocket can then be aligned and the tenons slid within the grooves. The beveled head of the spring loaded piston allows the piston to automatically capture the new pocket support portion once it is placed in its final position.

This improved pocket support portion significantly reduces the downtime of a bottling line due to a changeover. No tools are needed to effect the changeover as it relates to container guides and skilled labor is generally not required. The machine operator is capable of depressing the button to release and slide the pocket support portion out of position. The process is reversed to replace the pocket support portion with a different size pocket support portion. No adjusting or other tools are required. Thus, after the initial modifications, no further modifications other than the adjustments described above are required to run different size bottles.

In another aspect of the invention, the ledge support assembly is provided with a back support portion. The back support portion includes a back rest portion attached thereon for supporting the container body portion in a single position during rotation, including a quick connect second locking mechanism for releasably attaching the back rest portion to the back support portion. The back support portion includes a mechanism for adjusting the position of the back support to accommodate different size bottles in an axial manner along the length of the bottle. In a preferred embodiment, this includes a longitudinally extending positioning rod having longitudinally spaced concave grooves at increments along the length and a positioning block thereon. The positioning block includes a piston cooperable with the concave grooves for releasably attaching the positioning block to the positioning rod. It will be appreciated that the positioning block can slide up and down along the length of the post and be locked into a desired position by the piston engaging a specific concave groove.

The back rest portion is releasably attached by the second locking mechanism to the positioning block of the back support. A piston having characteristics very similar to those used on the pocket support portion is used to engage and retain the back rest portion on the positioning block. However, in a preferred embodiment, the piston is located on the back rest portion which is interchangeable with different size back rest portions. Again, the piston includes a beveled head portion which engages with a countersunk slot located on the positioning block effectively allowing the back rest portion to be snapped into place. To prevent rotational movement of the back rest portion about the positioning block, a stud is placed on the positioning block which is aligned in substantial registry with a mating hole on the back rest portion. The stud fits into the mating hole and coacts with the piston lock for releasably attaching the back rest portion to the back support and specifically the positioning block. The back rest portion, like the pocket support portion, includes a generally semicircular concave pocket. However, unlike the pocket support portion, the concave pocket has a diameter generally equal to the diameter of the bottle which will rest therein. Thus, when different size bottles are to be run on the line, the back rest portion is changed by depressing the piston and rotating the back rest portion away from the back support and sliding the back rest portion off of the stud. The new back rest portion and its mating hole is then aligned in substantial registry with the stud and placed thereon and rotated into position, the piston automatically locking the back rest portion into position. After initial retrofit takes place on the positioning block, the modified container guide is ready for use with a number of different size bottles in the bottling plant.

It is thus, an outstanding object of the present invention to provide an improved ledge support assembly for a bottling machine.

It is yet another object of the present invention to provide an improved ledge support assembly for a bottling machine which does not require tools for adjustment and positioning.

Still another object of the present invention is to provide a bottling machine which is retrofitted to provide ledge support assemblies on a rotatable wheel which are adjustable for different size containers without the use of tools.

Yet another object of the present invention is to provide an improved bottling machine in which ledge support assemblies can be adjusted for different size containers without removal or replacement of the rotatable wheel.

Yet still another object of the present invention is to provide an improved bottling machine which reduces the idle time required for a changeover of equipment on the bottling line.

It is yet another object of the present invention to provide an improved bottling machine with a ledge support assembly which is easily attached and retrofitted to existing bottling equipment without significant modification to the existing equipment or the bottling line.

Still yet another object of the present invention is to reduce the costs associated with the changeover of equipment on a bottling line.

These and other objects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiments of which will be described in detail and illustrated in the accompanying drawings which form a part hereof and wherein.

DESCRIPTION OF THE PREFERRED EMBODIMENTS

Figure 1:
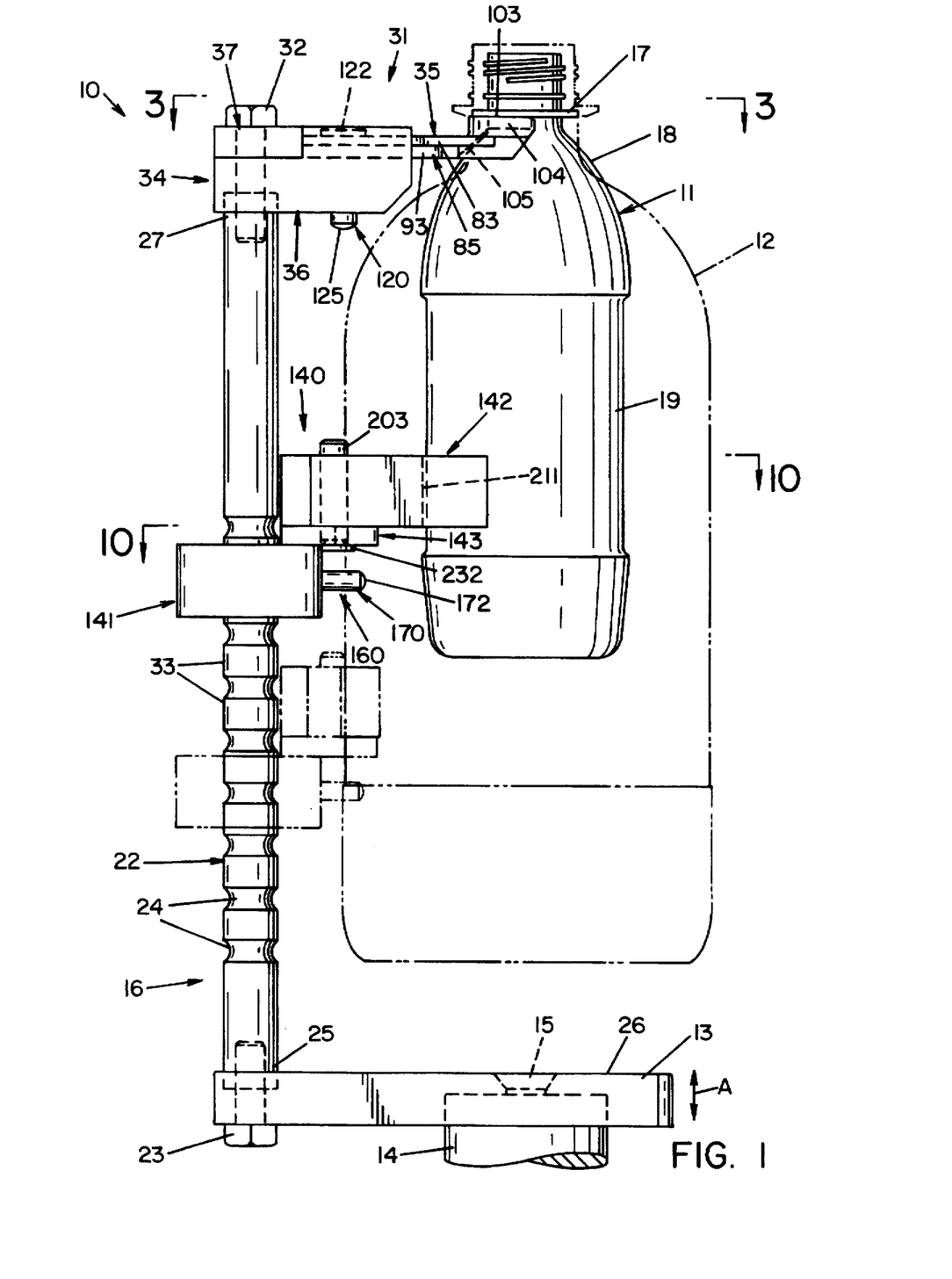
FIG. 1 is a front elevation view of the improved ledge support assembly of the present invention showing the invention being utilized in filling containers of two different sizes.
Figure 2:
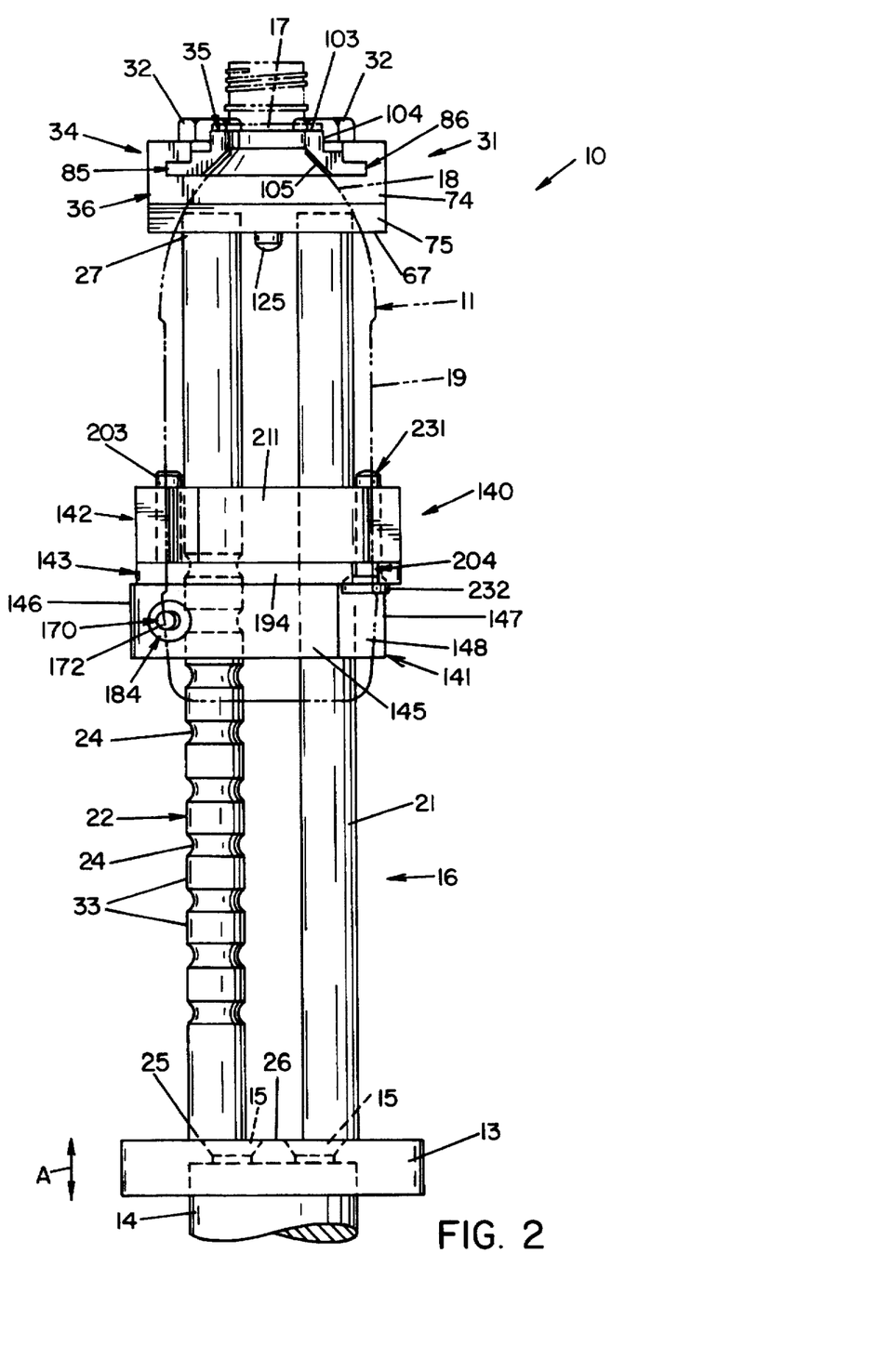
FIG. 2 is a side elevation view of FIG. 1.
Figure 3:
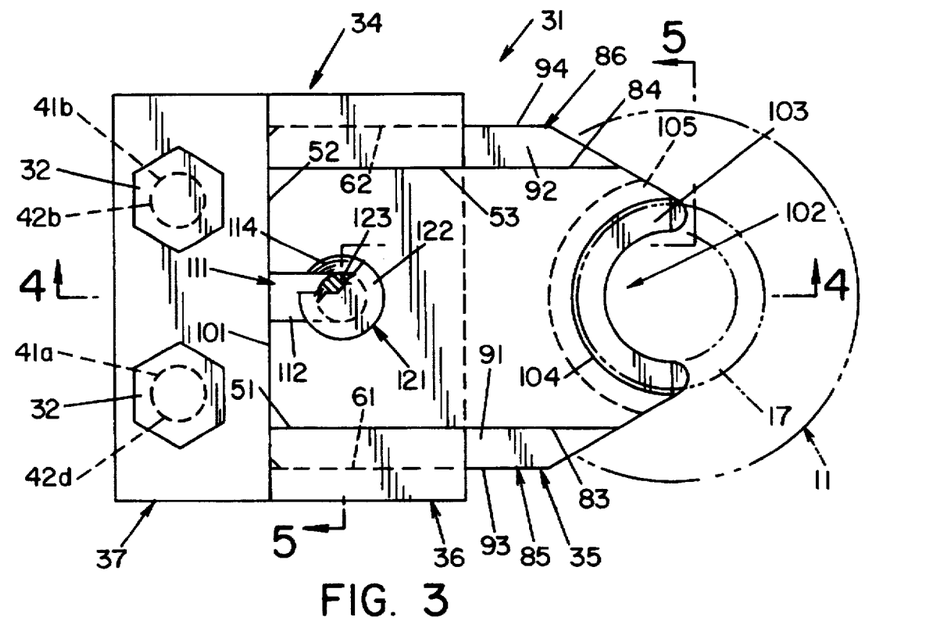
FIG. 3 is a plan view taken along line 3—3 of FIG. 1.

Referring now to the drawings wherein the showings are for the purpose of illustrating the preferred embodiment of the invention only, and not for the purpose of limiting same, FIGS. 1 and 2 show an improved ledge support assembly 10 of the present invention. FIG. 1 shows how the ledge support assembly 10 is adaptable for supporting different size bottles. As seen, bottle 11 is a 12-ounce container while bottle 12 shown in phantom is a 1-liter bottle. The interchageability of parts as provided by the present invention allows that the single ledge support assembly 10 may support these different size bottles. As specifically shown in the preferred embodiment, ledge support assembly 10 is for a bottle filling machine. Each of ledge support assemblies 10 is attached to the periphery of a rotatable wheel (not shown) by individual bottom ledge plates 13. A typical filling machine may include anywhere between 45 and 95 individual bottom ledge plates 13. Typically, dependent upon the diameter of a rotatable wheel, there are either 45, 72 or 95 individual ledge plates 13 for a filling machine. In conjunction therewith, each individual bottom ledge plate 13 is connected to a lift cylinder rod 14 by the fasteners 15. At the appropriate time, each of lift cylinder rods 14 actuate to lift bottom ledge plate 13 and thus lift ledge support assembly 10 connected thereto upward in a vertical or axial direction as defined by arrow A in FIGS. 1 and 2. Thus, the mouth of bottle 11 or 12 is inserted over a filling head (not shown) on the filling machine. Product is dispensed into bottle 11 or 12 and, when completed, lift cylinder rod 14 is again actuated to lower bottom ledge plate 13 along vertical axis A, removing the mount of bottle 11 or 12 from the filling head. The rotatable wheel then causes bottle 11 or 12 to be rotated out of the filling machine and onto further processing or handling equipment within the bottling line. It will be appreciated that these aspects of the bottling machine and rotatable wheel (not shown) are disclosed in the copending prior applications of Applicant which are incorporated by reference and upon which a claim of priority has been made.

Ledge support assembly 10 includes a vertical standard 16 comprised of a vertical post 21 and a generally parallel vertical positioning rod 22. Each of vertical post 21 and vertical positioning rod 22 are fastened to bottom ledge plate 13 of ledge support assembly 10 by a common fastener, such as threaded bolts 23. Each of vertical post 21 and vertical positioning rod 22 like the majority of parts herein disclosed, are stainless steel. Vertical positioning rod 22 includes concave grooves 24 spaced at equal increments along a length between a lower end 25 abutting a top surface 26 of bottom ledge plate 13 and an upper end 27 which is attached to a neck assembly 31 via hex head bolt fasteners 32. A ring portion 33 of positioning rod 22 divides each of concave grooves 24 into equal increments. It will be appreciated that hex head bolts 23 and 32 pass through bottom ledge plate 13 and neck assembly 31, respectively and are screwed into a tapped bore within each of lower end 25 and upper end 27 of post 21 and positioning rod 22.

As best seen in FIGS. 3–9, neck assembly 31 is comprised of two distinct portions, those being a neck support bracket 34 and a pocket support portion 35. Neck support bracket 34 is permanently attached to vertical post 21 and vertical positioning rod 22 by hex head bolt fasteners 32 as described above. In order to reduce costs in materials and for ease of manufacturing and machining, neck support bracket 34 includes lower bracket portion 36 and upper bracket portion 37. Upper bracket portion 37 includes two holes 41a and 41b therethrough aligned in substantial registry with holes 42a and 42b which pass from ledge surface 42 to counterbore 44 adjacent bottom bracket surface 45. Vertical positioning rod 22 is fitted within counterbore 44 whereupon hex head bolt fastener 32 passes through holes 41a, 42a to hold vertical positioning rod 22 in position with neck assembly 31. It will be appreciated that upper bracket portion 37, which is simply a rectangular block, may be comprised of a material other than stainless steel which is the preferred material in the other portions of the ledge support assembly 10. This can reduce costs as well as allowing a more secure fit between neck assembly 31 and either of vertical post 21 or vertical positioning rod 22.

Figure 8:
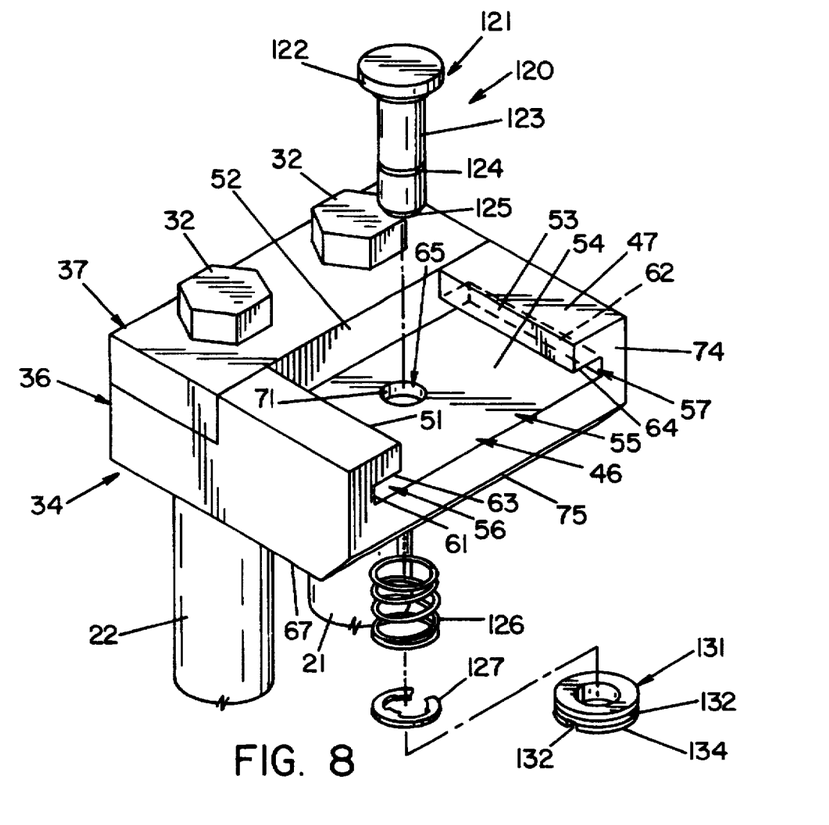
FIG. 8 is an exploded view of the locking mechanism in accordance with one aspect of the present invention.

The placement of upper bracket portion 37 and lower bracket portion 36 forms a pan area 46 which is essentially a recessed depression extending from an upper side 47 of lower bracket portion 36. The pan area 46 includes three side walls 51, 52 and 53, generally perpendicular to upper side 47 and extending between upper side 47 and a pan surface 54 which is generally parallel to upper side 47. Side wall 52 is formed by the outer surface of outer bracket portion 37 which is adjacent pan area 46. Side walls 51 and 53 extend from side wall 52 and are generally parallel. Opposite side wall 52 is an opening 55. A first groove 56 is cut within side wall 51 and a second groove 57 is cut within side wall 53. Each of grooves 56 and 57 extend axially upward from pan surface 54, are generally open to pan area 46 and opening 55, as seen at FIG. 8 and have an outer wall 61 and 62, respectively. A top surface 63 extends between outer wall 62 and side wall 51 while a top surface 64 extends between outer wall 62 and side wall 53. A hole 65 extends between pan surface 54 and lower bracket surface 67. Hole 65 actually includes three distinct portions which are a top portion 71 adjacent pan surface 54, a threaded counterbore portion 72 adjacent lower bracket surface 67 and an unthreaded counterbore portion 73 therebetween. Radially outward surface 74 extends below and around opening 55. Extending between generally perpendicularly oriented surfaces radially outward surface 74 and lower bracket surface 67 is a chamfered edge surface 75 oriented at a generally 45° angle relative to either of radial outward surface 74 or lower bracket surface 67.

Figure 7:
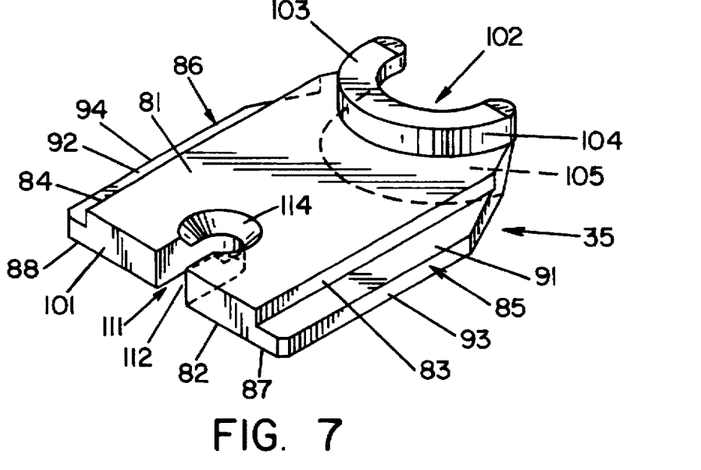
FIG. 7 is a detail view of a pocket support portion of the present invention.

Pocket support portion 35 includes an upper surface 81 and a lower surface 82. Generally parallel side walls 83 and 84 extend between upper surface 81 and lower surface 82. Extending from side walls 83 and 84 are tenons 85 and 86, respectively. Each of tenons include a bottom wall 87, 88 which is common to lower surface 82, a top wall 91, 92, respectively opposite and generally parallel to bottom wall 87 and 88 and a tenon wall 93, 94, with tenon wall 93 extending between top wall 91 and bottom wall 87 and tenon wall 94 extending between top wall 92 and bottom wall 88. Opposite a radial inward edge 101 is a neck pocket 102 having a semicircular cross-section and encompassing an included angle of approximately 180°. Bottle neck flange 17 rests on a top surface 103 of semicircular neck retaining pocket 104. As can be seen in FIG. 7, neck retaining pocket 104 extends from and is disposed on upper surface 81 of pocket support portion 35. A chamfered semicircular surface 105 extends from neck retaining pocket 104 radially inward to lower surface 82 of pocket support portion 35. The chamfered semicircular surface 105 accommodates the widening of bottle 11 or 12 in the shoulder region 18 between bottle neck flange 17 and bottle body portion 19.

Extending within pocket support portion 35 from radial inward edge 101 is a recess 111 which is comprised of a slotted portion 112 and a countersunk portion 114. It will be appreciated, as can be seen at at least FIG. 7, that recess 111 extends between upper surface 81 and lower surface 82 and that countersunk portion 114 extends from upper surface 81.

Fitted within piston hole 65 is an adjustable locking mechanism 120. Adjustable locking mechanism 120 is comprised of a piston plunger 121 having a beveled head portion 122 and a shank portion 123 extending therefrom. Located on shank portion 123 is a circumferential groove 124. The outside diameter of shank portion 123 is generally equal to or slightly less than top portion 71 of piston hole 63. An outwardly extending end 125 of piston plunger 121 is convex and opposite beveled head portion 122. Fitted over shank portion 123 of plunger 121 is a compression spring 126 having a diameter generally equal to that of unthreaded counterbore portion 73. A snap ring 127 is adapted to slide over shank portion 123 and snap into circumferential groove 124 where it is retained. Retaining locking mechanism 120 within piston hole 65 is a containment insert 131 having a threaded portion 132 adapted to be threaded into tapped counterbore portion 72 of piston hole 65 by using the screwdriver grooves 133 on a front face 134 of containment insert 131.

Figure 4:
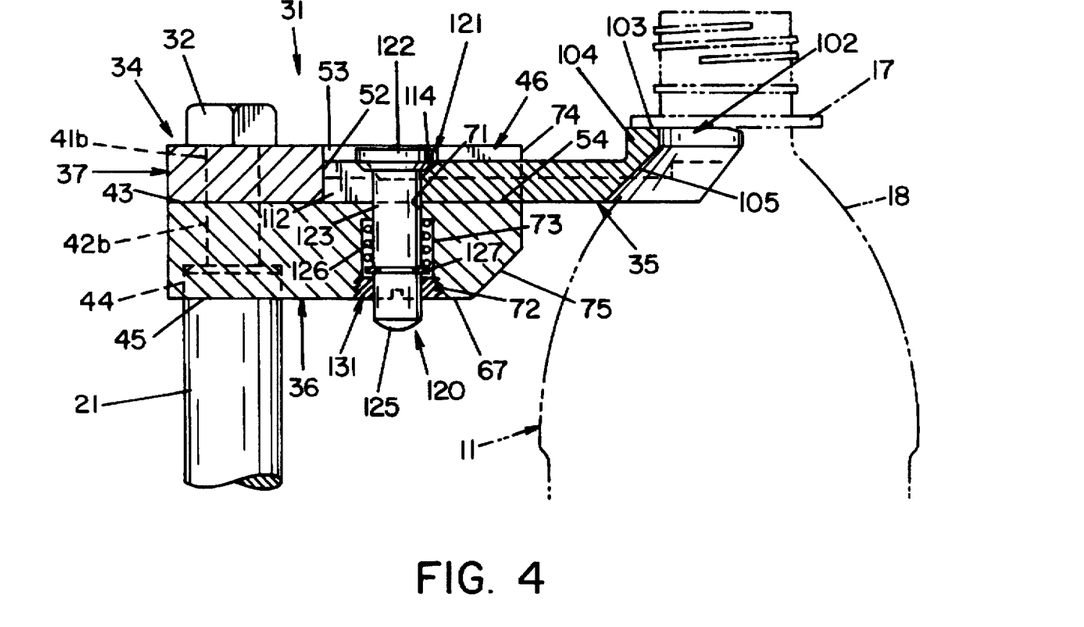
FIG. 4 is a cross-sectional elevation view taken along line 4—4 of FIG. 3.
Figure 5:
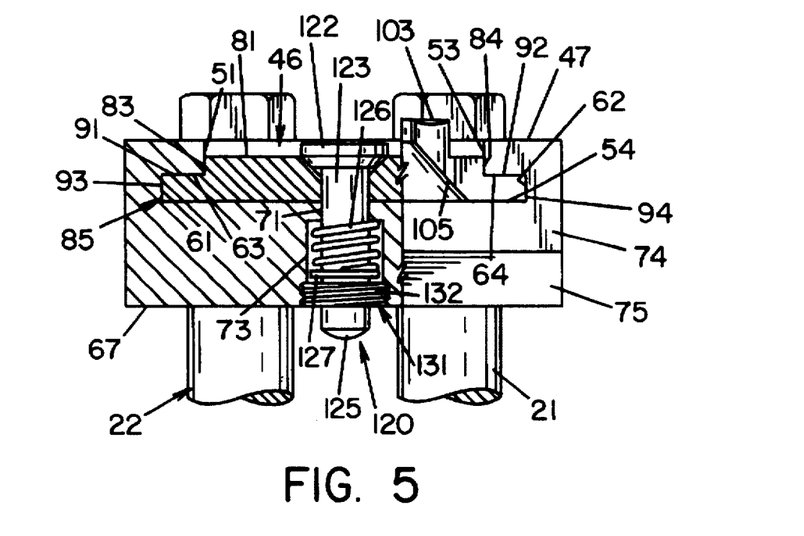
FIG. 5 is a side view, partially in cross-section, taken along line 5—5 of FIG. 3.
Figure 6:
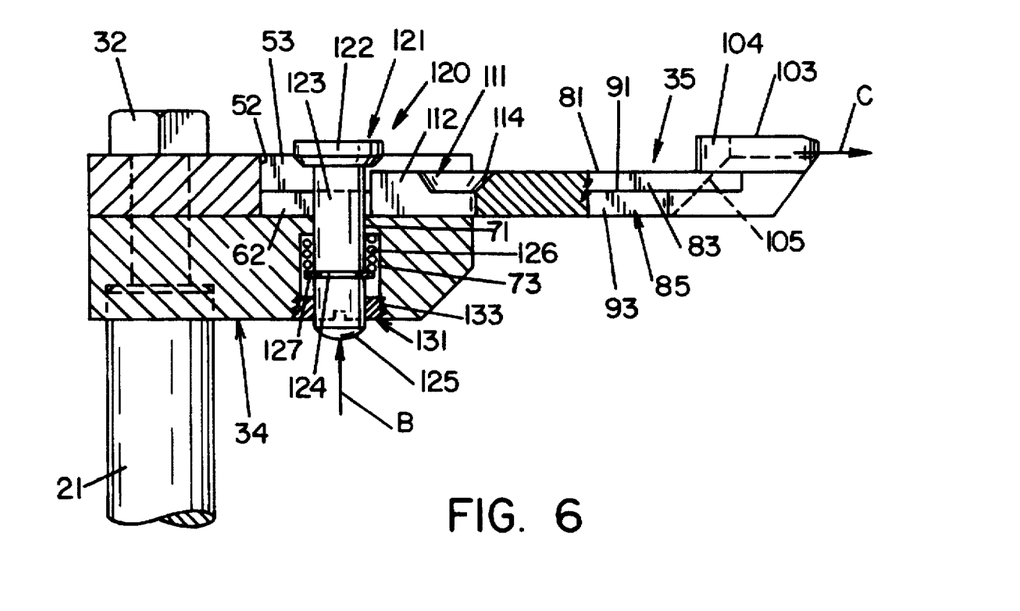
FIG. 6 is a cross-sectional elevation view like that of FIG. 4 showing the pocket support portion being removed from the ledge support assembly.

It will thus be appreciated that locking mechanism 120, as assembled, is capable of moving between an extended (locked) position at FIG. 4 and a depressed position (unlocked) as shown in FIG. 6. FIG. 4 shows compression spring under slight tension to retain beveled head portion 122 within countersunk portion 114, while FIG. 6, as shown by arrow B, shows compression spring 126 compressed at one end of counterbore portion 73 thus raising beveled head portion 122 from its interference fit with countersunk portion 114 and allowing pocket support portion 35 to be removed. While locking mechanism 120 retains pocket support portion 35 in a radial direction as shown by arrow C in FIG. 6, the interaction between tenons 85 and 86 and first groove 56 and second groove 57, respectively, prevents movement of pocket support portion 35 in a circumferential and axial direction.

Figure 9A:
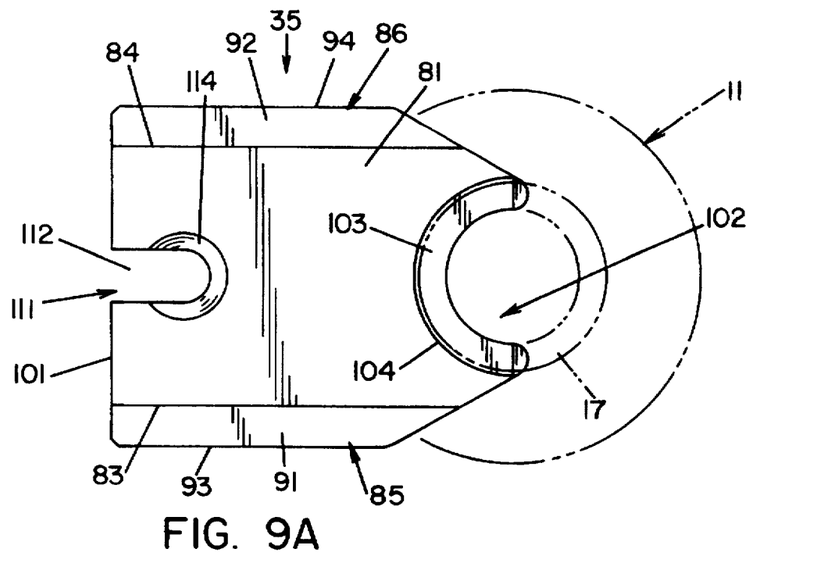
FIGS. 9a and 9b are plan views of the pocket support of the present invention showing differing sizes which can be used.
Figure 9B:
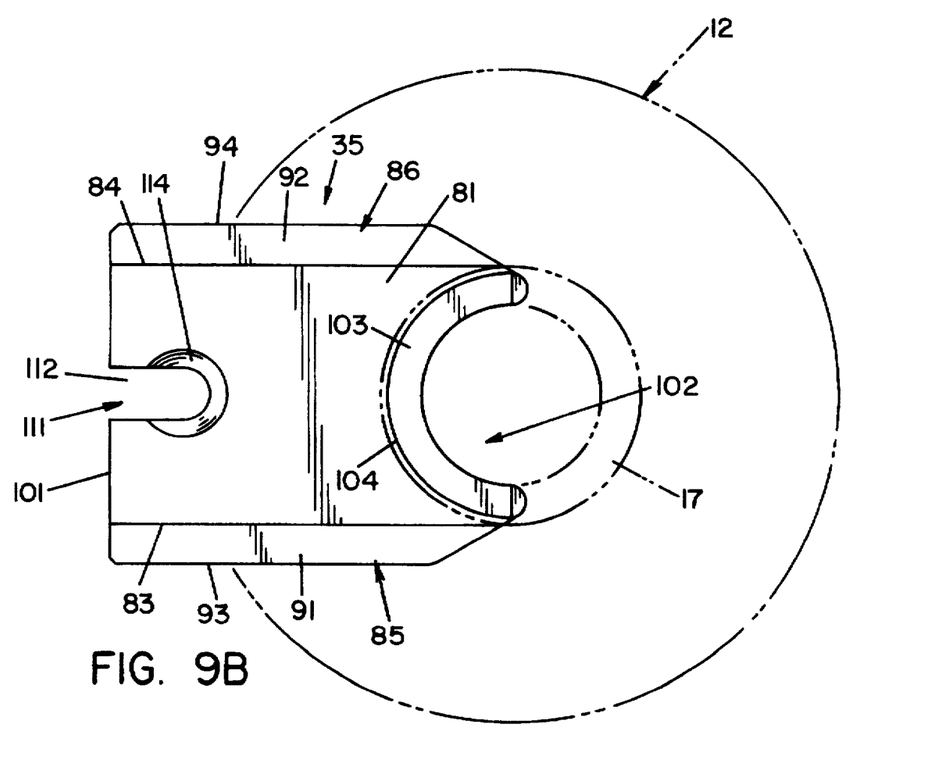

Thus, the two parts, as shown in FIGS. 9a and 9b, wherein FIG. 9a shows a 28 mm pocket support portion 35 adapted to support a 12-ounce container, and FIG. 9b shows a 38 mm neck adapted to support a 1-liter container, is interchangeable on ledge support assembly 10. As shown in FIG. 6, depression of piston plunger 121 at outwardly extending end 125 causes beveled head portion 122 to be raised from the interlocking fit with countersunk portion 114 of recess 111. Pocket support portion 35 can then slide radially outward, the direction of arrow C, until tenons 85 and 86 are free of first and second grooves 56 and 57. The pocket support portion 35 of FIG. 9b can then replace the pocket support portion 35 of FIG. 9a by reversing the process. It will be appreciated that all dimensions between FIGS. 9a and 9b are identical except for the diameter of neck pocket 102, which is 28 mm at FIG. 9a and 38 mm at FIG. 9b. Once tenons 85 and 86 engage with grooves 56 and 57, the pocket support portion of FIG. 9b can slide radially inward until slotted portion 112 of recess 111 engages with shank portion 123 and beveled head portion 122 of piston plunger 121. It will be appreciated that beveled head portion 122 allows the continued radially inward sliding movement of pocket support portion 35 until compression spring 126 relaxes slightly when beveled head portion 122 falls into an interference fit with countersunk portion 114. In this position, radial inward edge 101 is in substantial side by side contact with side wall 52.

Figure 10:
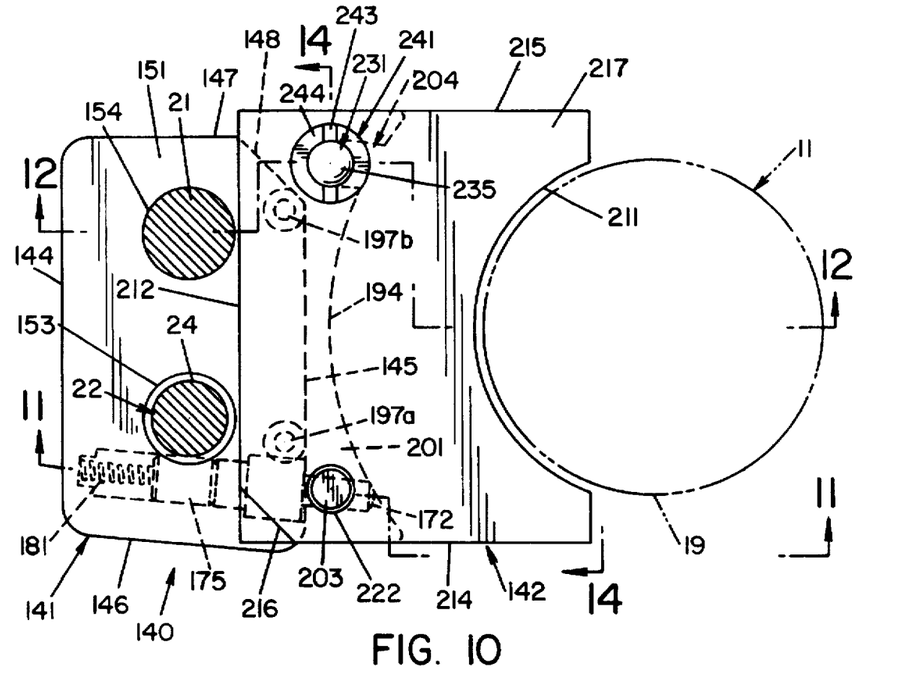
FIG. 10 is a plan view of another aspect of the present invention taken along line 10—10 of FIG. 1.
Figure 11:
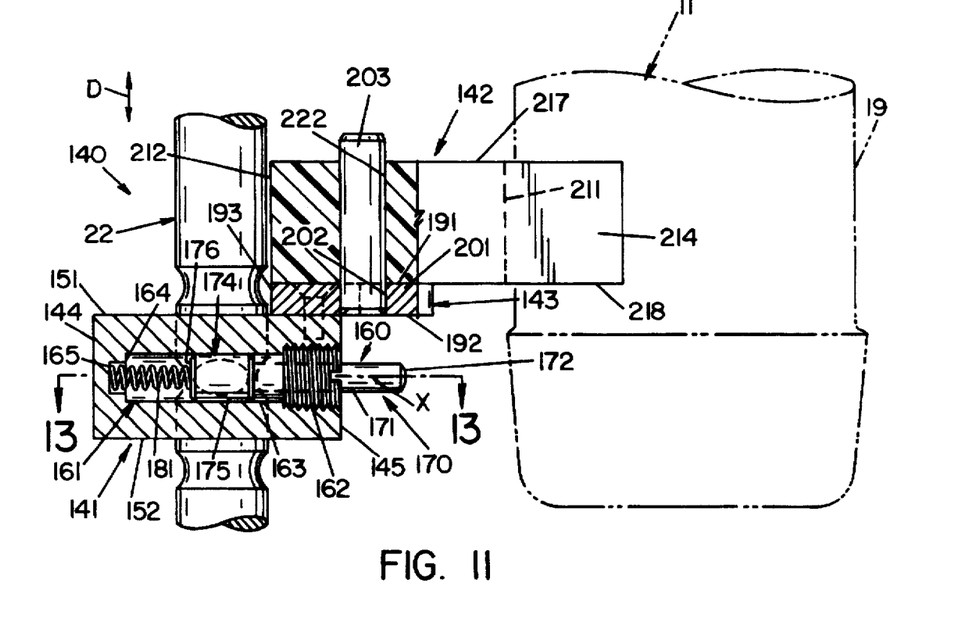
FIG. 11 is an elevation view, partially in cross-section, taken along line 11—11 of FIG. 10.
Figure 12:
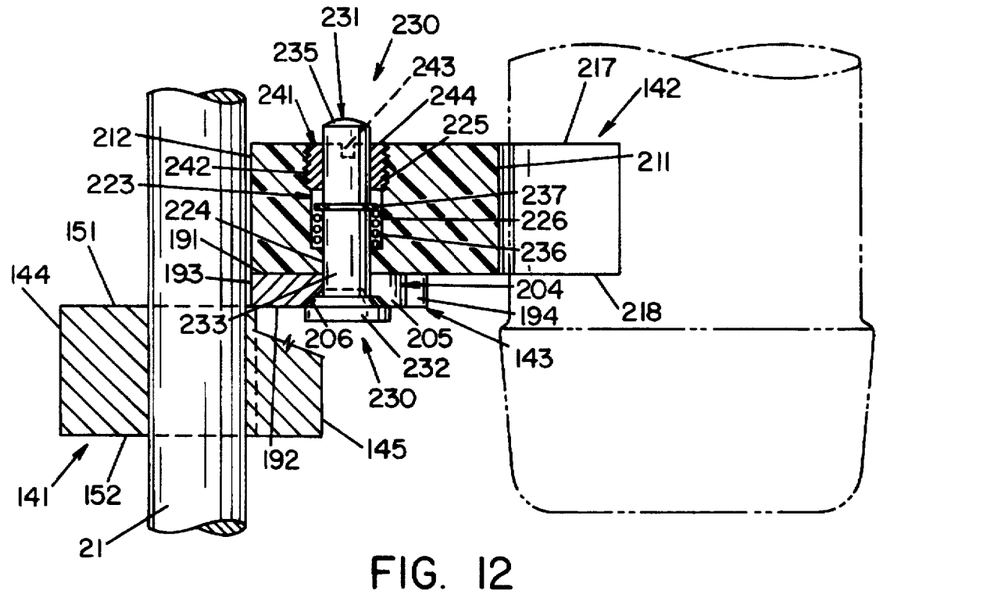
FIG. 12 is a cross-sectional elevation view taken along line 12—12 of FIG. 10.
Figure 13:
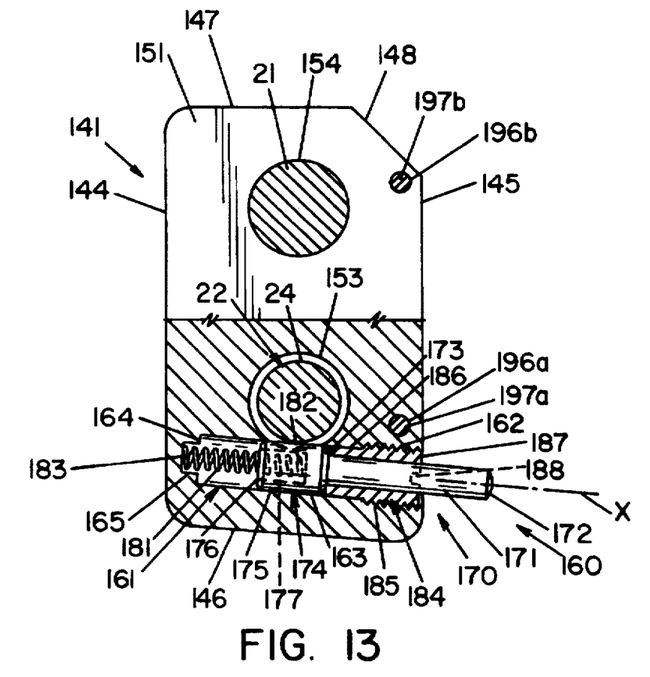
FIG. 13 is a cross-sectional plan view taken along line 13—13 of FIG. 11.
Figure 14:
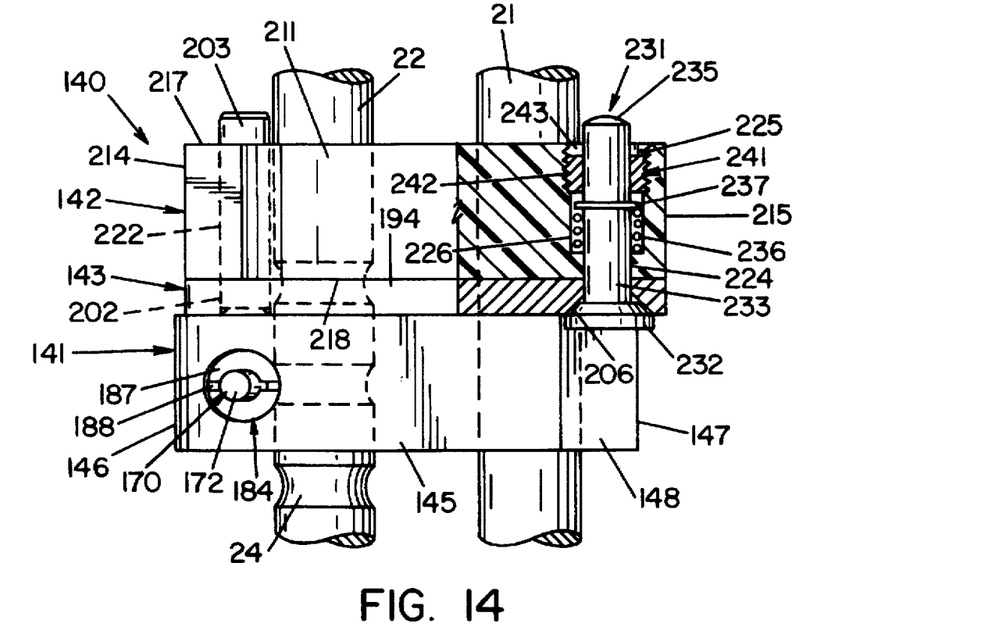
FIG. 14 is an elevation view, partially in cross-section, taken along line 14—14 of FIG. 10.
Figure 15:
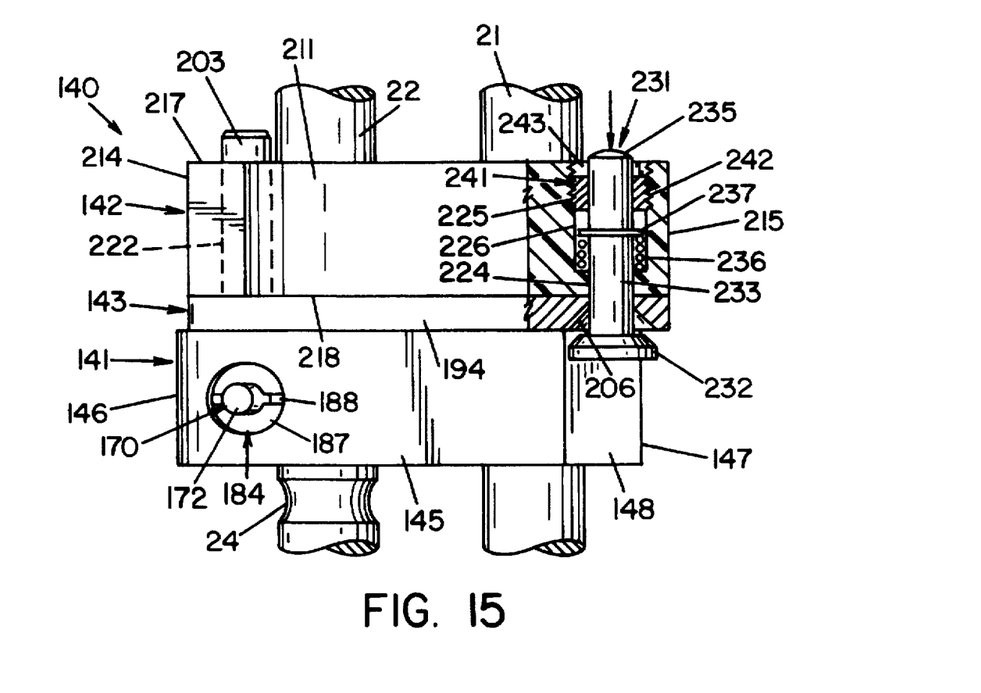
FIG. 15 is a view similar to FIG. 14 showing the back rest portion being removed from the ledge support assembly.
Figure 16:
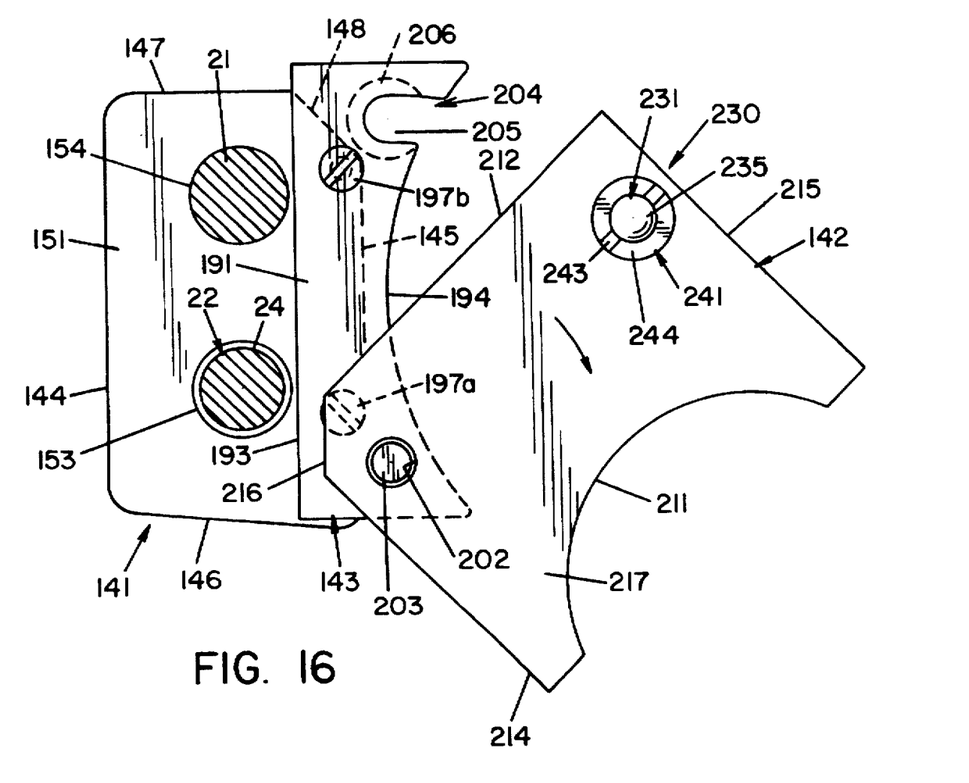
FIG. 16 is a plan view showing the back rest portion being rotated and removed out of position from the ledge support assembly.

In another aspect of the present invention, a back support 140 as seen in FIGS. 10 and 11 is provided. Back support 140 serves the purpose, together with a rear container guide (not shown), to contact opposite side walls of the body portion 19 of bottle 11 or 12 to maintain the bottles in position while rotated through the filling machine from an entry point to an exit point in the bottling line. Back support 140 is made part of ledge support assembly 10 by being suspended on vertical standard 16 and specifically axially slidable in a vertical direction on vertical post 21 and vertical positioning rod 22. Back support 140 is comprised of positioning block 141, back rest portion 142 and retrofit portion 143 disposed therebetween.

Positioning block 141 includes inner and outer sides 144 and 145, which are generally parallel and connected by side walls 146 and 147 disposed therebetween. Side wall 147 also includes an angle portion 148 adjacent outer side 145. Positioning block 141 also includes upper and lower sides 151 and 152, respectively. Two rod sleeves 153, 154 are placed within positioning block 141 which extend between upper and lower sides 151 and 152. Rod sleeves 153 and 154 are placed such that when ledge support assembly 10 is assembled, positioning block 141 is capable of vertical sliding movement, as shown by arrow D in FIG. 11 along vertical post 21 and vertical positioning rod 22 which extend through rod sleeves 153 and 154. Positioning block 141 is then capable of being easily moved to an optimum position to contact the side wall or body portion 19 of bottle 11 or 12.

In order to allow positioning block 141 to be locked into position, a locking mechanism 160 is provided adjacent and cooperable with rod sleeve 153. To facilitate locking mechanism 160, a piston hole 161 is bored within positioning block 141 from outer side 145 to a position adjacent inner side 144. Piston hole 161 includes a threaded counterbore 162 extending from outer side 145 which transitions into non-threaded counterbore portion 163. Counterbore portion 163 terminates at an end surface 164, while piston hole 161 extends beyond end surface 164 and terminates at a seat portion 165 having a diameter slightly less than that of counterbore portion 163. Piston hole 161 intersects with rod sleeve 153 for purposes which will be described hereinafter.

Fitted within piston hole 161 is the adjustable locking mechanism 160. Adjustable locking mechanism 160 is comprised of a piston plunger 170 having a longitudinally extending rod 171 which includes an outwardly extending convex end 172. Inwardly extending end 173 flares outwardly into a post engaging portion 174 forming a cylinder end 175. Opposite outwardly extending convex end 172, cylinder end 175 terminates at a compression end 176. Extending within cylinder end 175 from compression end 176 is a spring seat 177 for receiving a compression spring 181 therein. Compression spring 181 extends from a first end 182, located within spring seat 177, to a second end 183 placed within seat portion 165 of piston hole 161. To retain adjustable locking mechanism 160 in place, a threaded containment insert 184 having a threaded portion 185 at one end and a plug portion 186 at another end is screwed into threaded counterbore portion 162. Adjacent threaded portion 185 is a front face 187 having a screwdriver groove 188 thereon in order that threaded containment insert 184 may be screwed into threaded counterbore 162 of piston hole 161, as described above.

It will be appreciated that adjustable locking mechanism 160 is capable of moving between extended (locked) and depressed (unlocked) positions. As shown in FIGS. 10–13, locking mechanism 160 is placed in a locked position showing compression spring 181 at rest. It will be appreciated that upon compression of spring 181, i.e. depressing convex end 172 along an axis X, shown in FIG. 11, would cause cylinder end 175 to compress spring 181 nearly within seat portion 165 such that cylinder end 175 and specifically compression end 176 moves adjacent end surface 164. While depressed, piston plunger 170 is moved out of one of the concave grooves 24 of vertical positioning rod 22 in order that positioning block 141 may be adjusted vertically to a different desirable position depending on the type of bottle to be run on the bottling line.

In order to adequately support the body portion 19 of bottle 11 or 12, back rest portion 142, mentioned above, is provided. Back rest portion 142 is attached to positioning block 141 by a retrofit portion 143. As shown, retrofit portion 143 is a small stainless steel plate having top and bottom sides 191 and 192, respectively. Retrofit portion includes an inner edge 193 and an outer concave edge 194. Two holes 195a and 195b are tapped within retrofit portion 143 and extend between top and bottom sides 191 and 192. They are aligned in substantial registry with two tapped holes 196a and 196b on positioning block 141 and thus attach to positioning block 141 by threaded screws 197a and 197b. Retrofit portion 143 is attached to positioning block 141 such that outer concave edge 194 and the areas adjacent thereto creates a cantilever portion 201 which extends over outer side 145 of positioning block 141. A stud hole 202 is drilled within cantilever portion 201 between top and bottom sides 191 and 192. A stud 203 is welded therein such that it is essentially flush with bottom side 192 and extends above top side 191. Located opposite stud 203 is a recess 204, extending between top and bottom sides 191 and 192. Recess 204 includes a slotted portion 205 extending inwardly from outer concave edge 194 and a countersunk portion 206 where recess 204 terminates. It will be appreciated that the entirety of recess 204 is located within cantilever portion 201. The countersunk portion 206 extends into recess 204 from bottom side 192.

Figure 18A:
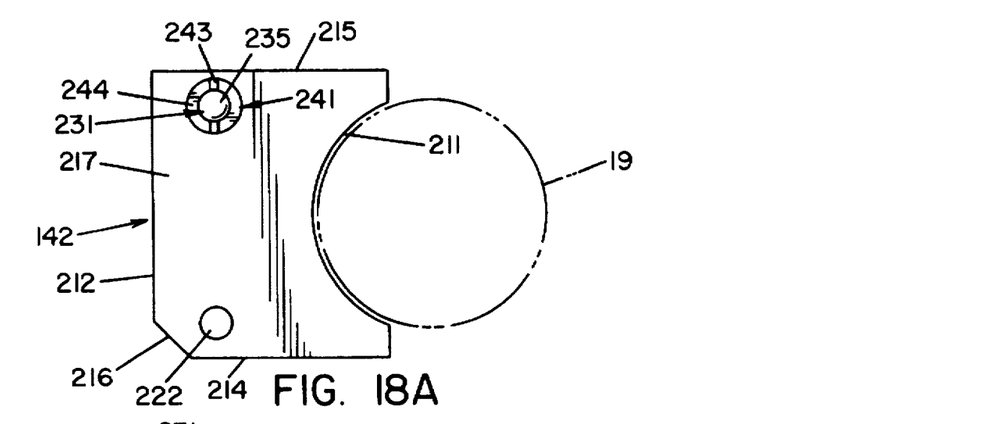
Figure 18B:
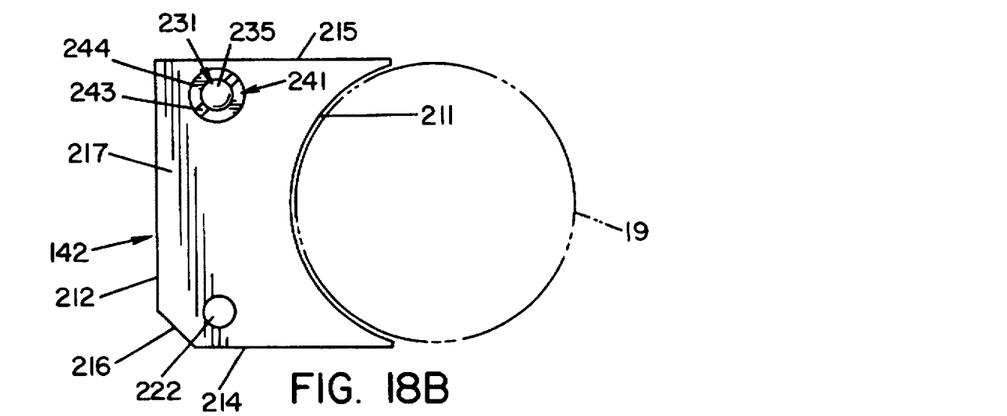
Figure 18C:
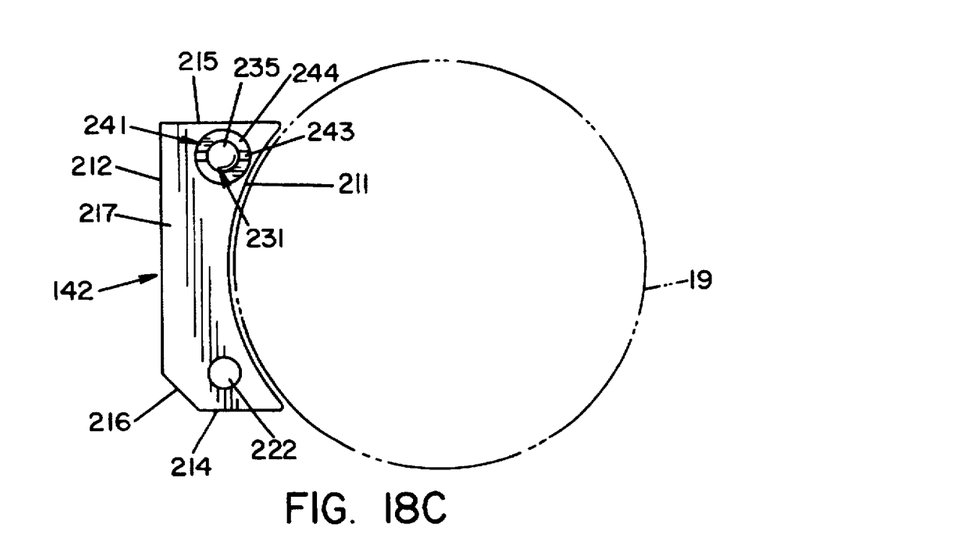

As shown in FIGS. 18a, 18b and 18c, three different sizes of back rest portion 142 are preferred in accordance with the invention. FIG. 18a shows a back rest portion 142 to accommodate a 12-ounce bottle, while FIG. 18b accommodates a 20-ounce and FIG. 18c accommodates a 1-liter bottle. The back rest portion shown in FIGS. 18a through 18c are identical except for the outer concave edge surface 211 which has a diameter to accommodate the different size bottles.

Figure 17:
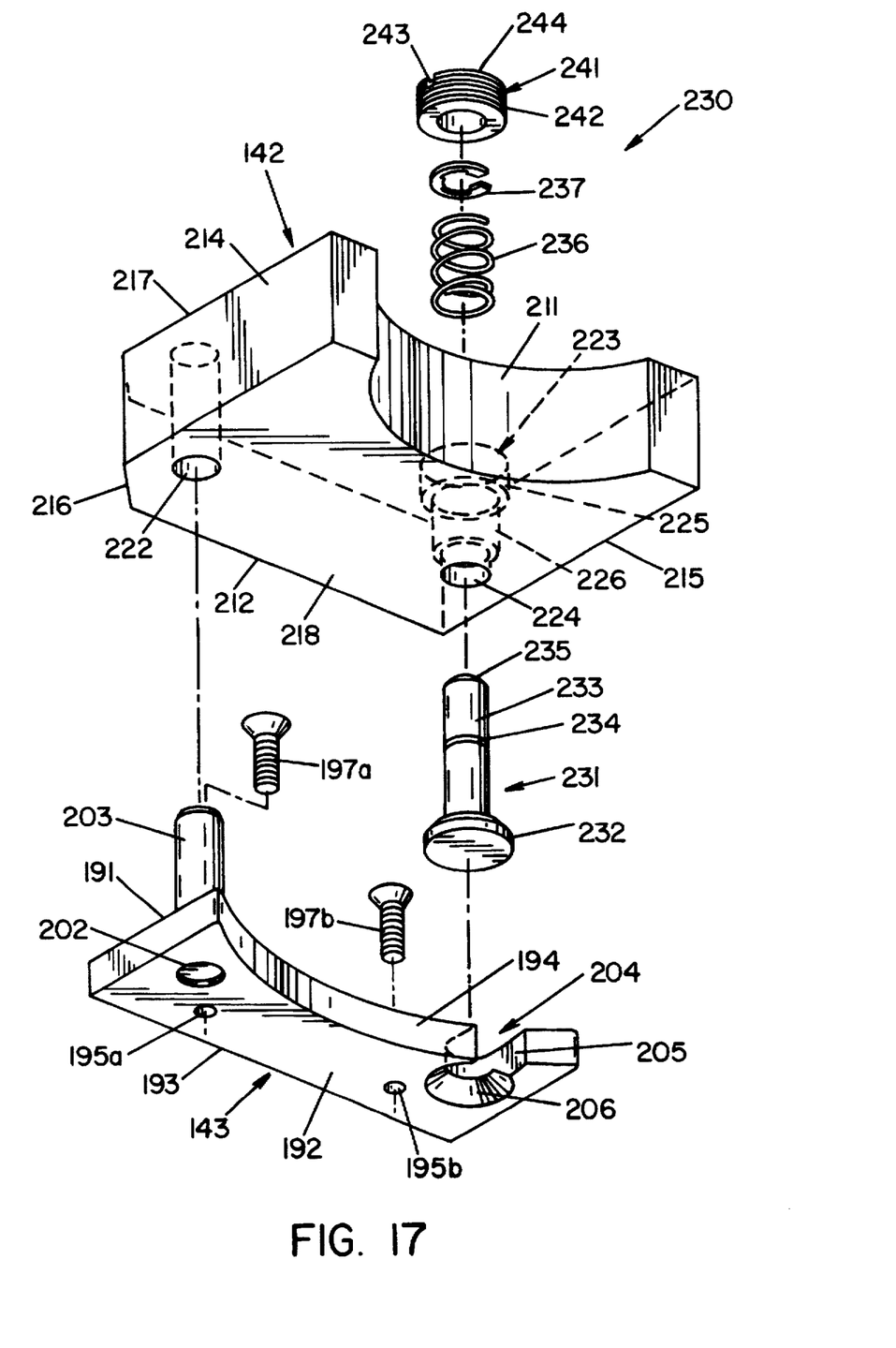
FIG. 17 is an exploded view showing the locking mechanism in accordance with another aspect of the present invention; and, FIGS. 18a, 18b and 18c show variant embodiments of the back rest portion, which are interchangeable with the ledge support assembly and which are adapted to accommodate different size bottles on a single bottling line.

Opposite outer concave edge surface 211 is inner edge surface 212 opposite edge surfaces 214 and 215 connect concave edge surface 211 with inner edge surface 212. Edge surface 214 includes an angled portion 216 allowing rotation of back rest portion 142, as described below. Back rest portion 142 includes top and bottom sides 217 and 218, respectively. A stud mating hole 222 is placed between top and bottom sides 217 and 218 for engaging with stud 203. While stud mating hole 222 is placed adjacent angled portion 216 of edge surface 214, a piston hole 223 is placed adjacent the corner where edge surface 215 intersects with inner edge surface 212. Piston hole 223 includes a bottom portion 224 extending inwardly from bottom side 218, a tapped counterbore portion 225 extending inwardly from top side 217 and an unthreaded counterbore portion 226 extending therebetween. It will be appreciated that piston plunger 231 combines with piston hole 223 and recess 204 to form an adjustable locking mechanism 230. As shown in the exploded view of FIG. 17, piston plunger 231 includes a beveled head portion 232, a shank portion 233 having a circumferential groove 234 extending therearound. An outwardly extending end 235 extends above top side 218. Fitted over shank portion 233 is a compression spring 236 which sits within unthreaded counterbore portion 226 and is retained therein between beveled head portion 232 and a snap ring 237 fitted within circumferential groove 234. A containment insert 241 is threaded within tapped counterbore portion 225 by a threaded portion 242 and screwdriver groove 243 located on front face 244 of containment insert 241. As can be seen, containment insert includes a hole extending therethrough allowing outwardly extending end 235 of piston plunger 231 to extend above top side 217 of back rest portion 142. It will thus be appreciated that locking mechanism 230 operates in substantially the same way as locking mechanism 120 described hereinabove.

When it is desired to change back rest portion 142 for one of the different sizes shown in FIGS. 18a through 18c, piston plunger 231 is depressed axially downward at extending end 235 causing beveled head portion 232 to disengage from countersunk portion 206. Thus, back rest portion 142 can be rotated out of position, since stud 203 is located within stud mating hole 222 forming an axis of rotation. Back rest portion 142 can then be lifted off of stud 203 and replaced with another back rest portion by aligning stud 203 with mating hole 222 and dropping back rest portion 142 thereover. Back rest portion 142 can then be rotated into place wherein tensile forces caused by spring 236 will keep beveled head portion 232 within countersunk portion 206.

The invention has been described with specific reference to the preferred embodiments, and further modifications and alterations may occur to others upon reading and understanding the specification. It is intended to include all such modifications and alterations insofar as they come within the scope of the invention.

Having thus described the invention, it is claimed:

1. An improved container guide for a bottling machine for filling or capping containers having a generally circular cross-section, a neck portion and a body portion, said container guide retaining said containers in said machine during movement through said machine, said machine including a rotatable wheel for moving said containers through said machine; means on said wheel for supporting said containers including a pocket support portion for holding and supporting said container neck and a back support for supporting said container body portion and retaining said container within said pocket support portion during rotation, said back support including means for maintaining said body portion of said container in position during rotation of said wheel, the improvement comprising means for adjusting the position of said back support to accommodate different size bottles.

2. The container guide of claim 1, wherein said means for adjusting the position of said back support includes an axially extending positioning rod and positioning block means thereon releasably attaching to said positioning rod.

3. The container guide of claim 2, wherein said positioning block means is attached to a back rest portion which supports said body portion of said container.

4. The container guide of claim 2, wherein said positioning rod is a post extending from said pocket support portion, said post including longitudinally spaced concave grooves at increments along the length of said post.

5. The container guide of claim 4, wherein said concave grooves are a circumferential concave grooves about said post.

6. The container guide of claim 5, wherein said concave grooves are spaced at equal increments along said length.

7. The container guide of claim 4, wherein said concave grooves are spaced at equal increments along said length.

8. The container guide of claim 2, wherein said positioning block means includes piston means cooperable with said positioning rod for releasably attaching said positioning block means to said positioning rod.

9. The container guide of claim 8, wherein said piston means includes a piston located within a hole within said positioning block means, said piston means further including biasing means for actuating said piston between a depressed position and an engaged position.

10. The container guide of claim 9, wherein said hole within said positioning block means has a hole bottom and said biasing means includes a compression spring within said hole, said compression spring between said hole bottom and said piston.

11. The container guide of claim 9, wherein said piston includes a rod portion at one end and a cylinder portion at a second end, said cylinder portion coacting with said positioning rod to lock said back support into position.

12. The container guide of claim 11, wherein said positioning rod includes longitudinally spaced concave grooves at increments along said positioning rod.

13. The container guide of claim 12, wherein said cylinder portion coacts with one of said longitudinally spaced grooves to form an interference fit to lock said back support into position.

14. The container guide of claim 13, wherein said positioning rod is a post extending generally from said pocket support portion.

15. The container guide of claim 13, wherein said cylinder portion includes a bore at said second end, said compression spring within said cylinder portion bore.

16. An improved container guide for a bottling machine for filling or capping containers having a generally circular cross-section, a neck portion and a body portion, said container guide retaining said containers in said machine during movement through said machine, said machine including a rotatable wheel for moving said containers through said machine; means on said wheel for supporting said containers including a pocket support portion for holding and supporting said container neck and a back support for supporting said container body portion and retaining said container within said pocket support portion during rotation, said back support including means for maintaining said body portion of said container in position during rotation of said wheel, the improvement comprising said back support including a back rest portion and locking means for releasably attaching said back rest portion to said back support.

17. The connection of claim 16, wherein said means for releasably attaching includes a spring loaded piston on said back rest portion cooperable with a recess on said back support, said spring loaded piston engaging said recess in tension to maintain said back rest portion on said back support.

18. The connection of claim 17, wherein said spring loaded piston includes a head portion and a shank portion, each having a diameter, said head portion having a diameter that is greater than said shank portion.

19. The connection of claim 18, wherein said recess includes a slotted portion and a countersunk portion for capturing said head portion.

20. The connection of claim 19, wherein said head portion includes a beveled portion adjacent said shank portion for mating with said countersunk portion.

21. The connection of claim 16, wherein said back support includes a stud and said back rest portion includes a mating hole therein, said stud fitting into said mating hole and coacting with said locking means for releasably attaching said back rest portion to said back support.

22. The connection of claim 21, wherein back rest portion includes top and bottom walls, said hole and locking means extending therebetween.

23. The connection of claim 22, wherein said back rest portion includes front and back side walls, said back side wall adjacent said back support, said front side wall having a concave contour for supporting and retaining said container body portion therein.

24. The connection of claim 16, wherein said back rest portion includes front and back side walls, said back side wall adjacent said back support, said front side wall having a concave contour for supporting and retaining said container body portion therein.

25. An improved ledge support assembly for a filling machine for filling containers having a generally circular cross-section, a neck portion and a body portion, said ledge support assembly supporting and retaining said containers in said machine during movement through said machine, said ledge support assembly including a pocket support portion for holding said neck portion and a back support portion including a back rest portion attached thereon for supporting said container body portion in a single position during rotation, the improvement comprising first locking means for releasably attaching said pocket support to said ledge support assembly and second locking means for releasably attaching said back rest portion to said back support portion.

26. The ledge support assembly of claim 25, including means for adjusting the position of said back support portion to accommodate bottles having different lengths.

27. An improved connection for a pocket support on a bottling machine for filling or capping containers having a generally circular cross-section, said bottling machine including rotatable wheel having a plurality of peripheral individual ledge support assemblies for receiving and moving said containers through said machine, each of said plurality of individual ledge support assemblies including said pocket support for holding said containers, the improvement comprising: said ledge support assembly including locking means for releasably attaching each said pocket support to said ledge support assembly.

28. The connection of claim 27, wherein said means for releasably attaching includes a spring loaded piston cooperable with a recess on said pocket support, said spring loaded piston engaging said recess in tension to maintain said pocket support on said ledge support assembly in a locked position.

29. The connection of claim 28, wherein said spring loaded piston includes a head portion and a shank portion, each having a diameter, said head portion having a diameter that is greater than said shank portion.

30. The connection of claim 29, wherein said recess includes a slotted portion and a countersunk portion for capturing said head portion.

31. The connection of claim 30, wherein said head portion includes a beveled portion adjacent said shank portion for mating with said countersunk portion.

32. The connection of claim 27, wherein said ledge support assembly includes at least one groove for laterally retaining said pocket support.

33. The connection of claim 32, wherein said pocket support includes at least one tenon extending therefrom for retaining said pocket support in said ledge support assembly.

34. A bottling machine for filling or capping containers having a generally circular cross-section comprising:
 a rotatable wheel means having at least one peripheral ledge support assembly for receiving and moving said containers through said machine;
 said at least one ledge support assembly including a neck assembly and pocket support means thereon for holding said containers;
 said neck assembly including snap locking means for releasably attaching each said pocket support means to said neck assembly and means for slidably engaging said pocket support means with said neck assembly.

35. The machine of claim 34, wherein said at least one ledge support assembly includes a pan area, said pocket support means fitting into said pan area.

36. The machine of claim 34, wherein said pan area is a recessed depression extending from an upper side of said ledge support assembly.

37. The machine of claim 36, wherein said recessed depression includes a side wall extending generally perpendicular to said upper side, and an opening in said side wall for slidably receiving said pocket support means.

38. The machine of claim 37, wherein said means for slidably engaging includes two groove portions within said sidewall, opposite and generally parallel, which extend from said opening into said pan area.

39. The machine of claim 38, wherein said means for slidably engaging further includes two tenons extending from said pocket support means, said tenons generally parallel and coacting with said two groove portions for longitudinal sliding therein and preventing lateral movement.

40. The machine of claim 34, wherein said at least one ledge support assembly includes a pan area, said locking means extending therein, said pocket support fitting into said pan area.

41. The machine of claim 40, wherein said locking means includes a spring loaded piston cooperable with a recess on said pocket support means, said spring loaded piston engaging said recess in tension to maintain said pocket support means on said ledge support assembly in a locked position.

42. The machine of claim 41, wherein said spring loaded piston includes a head portion and a shank portion, each having a diameter, said head portion having a diameter that is greater than said shank portion.

43. The connection of claim 42, wherein said recess includes a slotted portion and a countersunk portion for capturing said head portion.

44. The connection of claim 43, wherein said head portion includes a beveled portion adjacent said shank portion for mating with said countersunk portion.

* * * * *